Dec. 31, 1957  L. C. EMERICK ET AL  2,818,320
LOCATING MECHANISM
Filed March 22, 1956  2 Sheets-Sheet 1

INVENTORS
LLOYD C. EMERICK
WAYNE C. WELSH

BY Michael Hertz
ATTORNEY

Dec. 31, 1957 L. C. EMERICK ET AL 2,818,320
LOCATING MECHANISM
Filed March 22, 1956 2 Sheets-Sheet 2
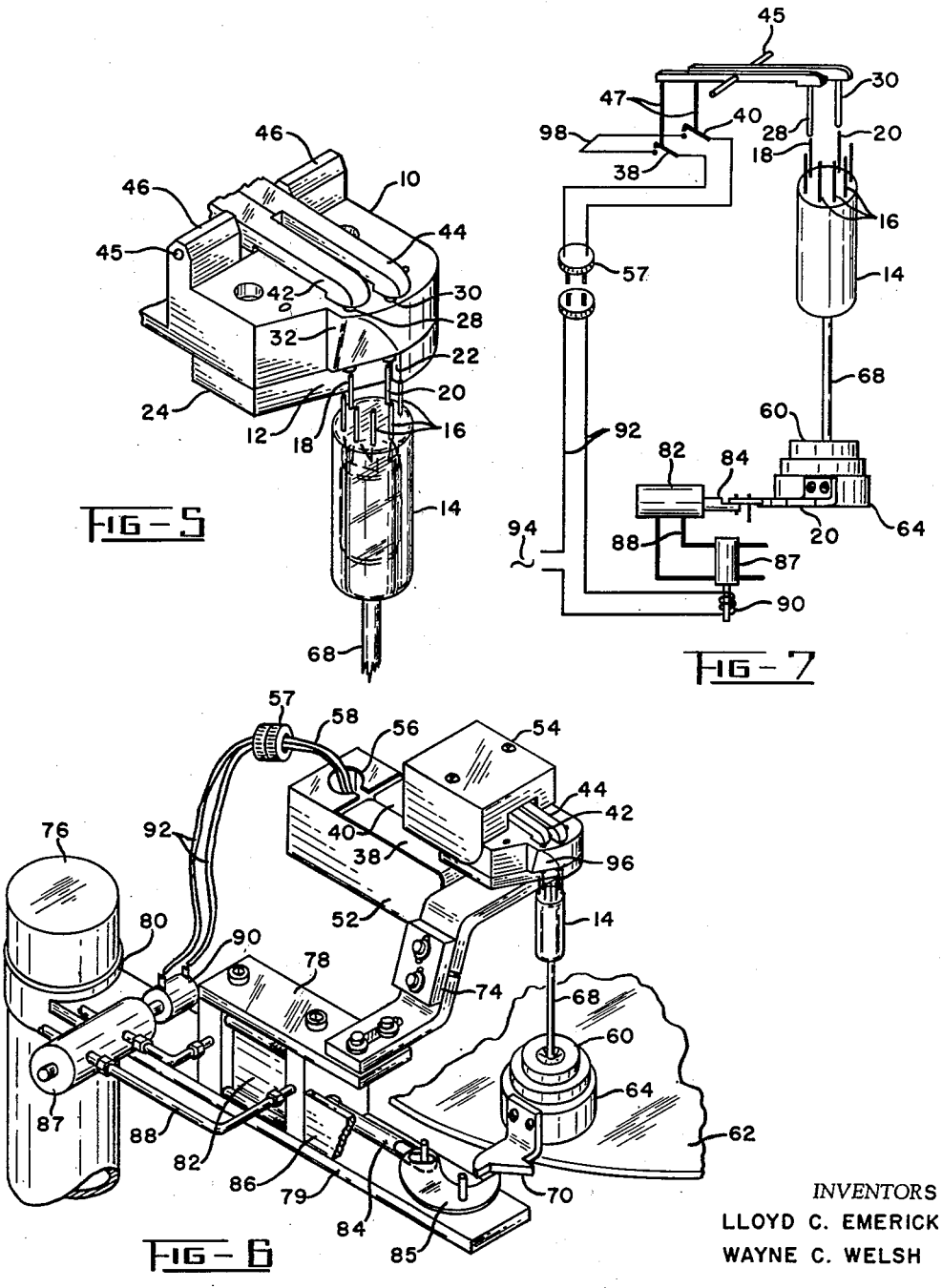
INVENTORS
LLOYD C. EMERICK
WAYNE C. WELSH
BY *Michael Hertz*
ATTORNEY

United States Patent Office 2,818,320
Patented Dec. 31, 1957

2,818,320

LOCATING MECHANISM

Lloyd C. Emerick and Wayne C. Welsh, Brookville, Pa., assignors to Sylvania Electric Products Inc., a corporation of Massachusetts Application March 22, 1956, Serial No. 573,150

8 Claims. (Cl. 316—30)

The present invention relates to a locating mechanism for use with articles having a keying portion and more particularly to a locating mechanism having means associated therewith to operate a holding mechanism for such articles as the latter are each placed in a position of predetermined orientation relative to the locating mechanism and the holding mechanism.

In the ensuing description and in the accompanying drawings the locating mechanism of the instant invention, for purposes of illustration, has been described and illustrated in connection with a combined sealing and exhausting machine having an indexing movement and known as a Sealex, utilized in the manufacture of electronic tubes. However, it will be obvious as this description proceeds, that the disclosed locating mechanism may be adapted to any other application wherein articles must be placed or secured in a predetermined orientated position relative to a station or a receptacle.

One type of Sealex machine includes a pair of concentric revolving turrets; an upper turret serving to seal portions of the tube envelope and a lower turret utilized in the evacuation of the envelope, accompanied by lighting of the heater and filament and inductional heating of the metallic tube ports. Such a machine is adapted to function in association with an electronic tube mount including a glass stem having lead-ins extending therethrough, and an elongated bulb having an open end for receiving the mount and provided with an exhaust tubulation at the opposite end. The upper turret of the machine includes a plurality of sealing heads from which the sealed mounts are transferred to the lower turret and which lower turret comprises a plurality of evacuating ports. Associated with a number of the evacuating ports are respective pairs of electrodes adapted to make the necessary electrical contact with the heater or filament lead-ins of the sealed mount during evacuation thereof. Each of the evacuating ports is provided with port closing mechanism arranged to grasp exhaust tubulation inserted into the port and to effect a hermetic seal therewith during the processing of the tube mount on the lower turret.

In the operation of said Sealex machine it is necessary to transfer the tube mounts being sealed on the upper turret of the machine to a position relative to the evacuating port whereat the exhaust tubulation of the sealed mount is inserted into and grasped by the port closing mechanism. When inserting a mount into the port as aforesaid, it is essential that the mount be so orientated relative to the electrodes associated with each port that the heater or filament leads of the sealed mount make electrical contact with said electrodes in order to energize or light up the heater or filament. This energization is essential to break down the cathode coating and to aid in the evacuation of occluded gases from various components of the sealed mount. It is obvious, therefore, that the operator must take care to avoid misorientating the sealed mounts relative to the lighting electrodes. Before the present invention it has been the practice to have the operator actuate a pedal or manual means, after inserting the sealed mount into the evacuating port, to cause the tubulation to be clamped and hermetically sealed in the evacuating port. Since the port-closing operation was controlled entirely by the operator, in conventional machines, and there was no means for ensuring proper orientation of the sealed tube mount, the orientation thereof, therefore, depended entirely on the skill of the operator. This port-closing operation caused considerable operator fatigue and distraction, which frequently resulted in misorientated sealed mounts, as described heretofore. Furthermore, a manual or pedal port-closing mechanism, being under the control of the operator, allowed an inattentive operator to insert and subsequently clamp the sealed mount in the evacuating port in a misorientated position relative thereto.

During the processing of electronic tubes on the afore-described Sealex machine, the same are subjected also to inductional heating by means of a series of coils, in the well-known manner. The coils are set at varying heights relative to the internal electrode structure of the tube for efficacious heating thereof; and accordingly, to ensure uniform heating of the tubes being processed it is essential that they be secured in the evacuating ports of the Sealex at the same relative height or elevation. Heretofore, the proper height has been determined either by judgment of the operator or by the physical structure of the evacuating port and error frequently has resulted either from misjudgment of the operator or from variations in the length of exhaust tubulation or of other parts of the tube envelope, or from accumulations of glass or dust particles in the ports.

In addition to loading and transferring the mounts on the Sealex the operator thereof is frequently required to perform inspectional duties and minor maintenance activities, for an example, cleaning residual amounts of glass and dust from the evacuating ports, during operation of the Sealex, to avoid costly shutting down of the Sealex. The time required for the performance of the aforementioned functions by the operator imposes a practical limit on the speed at which the Sealex and related processing equipment may be run, which limit is below that of which the Sealex unit is fundamentally capable. The constant attention of the operator required for such additional maintenance and inspectional duties is a further cause of misorientation of the tube mounts inserted into the evacuating ports. As a result of the misorientation, the sealed mount, when processed into a finished tube produces a shrinkage or defective tube, since the lighting or energization of the heater or filament, as described heretofore, is essential to the proper activation of the finished tube. This shrinkage results in considerable waste not only from the loss of the tube itself but also due to the fact that such lighting or energization takes place relatively early in the tube processing schedule, and the defects resulting from the lack thereof is, as a practical matter, not usually apparent until the first testing stage of the finished tube, that is not until after considerable time has been expended in processing the defective sealed mount into the finished tube.

Accordingly, it is an object of the present invention to provide locating mechanism for ensuring the proper orientation of an article relative to a station, port and the like.

It is another object of the invention to permit the operation of a Sealex machine and the like at a higher speed with greater efficiency.

A further object of the invention is the provision of locating mechanism to aid the operator of a Sealex machine in properly orientating the sealed mount relative to the evacuating port and lighting contacts thereof.

Still another object of the invention is the provision of mechanism for quickly and efficiently activating the port closing or clamping means of a Sealex machine, Still another object of the invention is the provision of locating mechanism for ensuring the proper orientation of the sealed mount relative to the evacuating port and lighting contacts, which mechanism has means associated therewith for clamping or closing the evacuating port about the exhaust tubulation of the sealed mount inserted therein.

Still another object of the invention is the provision of locating mechanism having port closing means associated therewith, which port closing means can be operated only when the sealed mount is properly orientated relative to the locating mechanism and the evacuating port of the Sealex.

Yet another object of the invention is to increase the portion of operator time devotable to inspection of mounts and tubes processed on the Sealex machine.

Another object of the invention is the provision of locating mechanism adapted for use with a Sealex machine which locating mechanism is arranged to ensure the location of each one of the sealed mounts loaded into the evacuating ports of the machine at a predetermined height or elevation relative to the lighting contacts and the inductional coils of the Sealex machine.

According to one application of the invention a locating mechanism is mounted adjacent the loading position of the lower or evacuating turret of the Sealex. The locating mechanism is provided with mechanical linkage arranged for operating switch means connected in series relationship with electromagnetic port closing means and a source of electric potential. The aforesaid linkage is so arranged that it can be operated only when the sealed mount is in its properly orientated position and is set at a predetermined height or elevation relative to the lighting contacts and inductional heating coils. When the sealed mount is thus positioned the switch means is actuated for closing the evacuating port without further manipulation thereof by the operator of the Sealex machine. If the mount is not so positioned the port remains open, thereby calling the operator's attention to the fact that the mount has not been properly positioned either in angular orientation or in elevation relative to the aforesaid port.

The aforementioned and other objects and features of the invention will be better understood from the following detailed description of illustrative applications of the invention, said description to be taken in conjunction with the accompanying drawings wherein:

Fig. 5 is an enlarged, partial, perspective view of one form of locating mechanism shown in preliminary engagement with an electronic tube mount.

Fig. 6 is a perspective view of one form of locating mechanism mounted in an illustrative application with relation to a Sealex machine.

Fig. 7 is an elevational view of a portion of an evacuating port of a Sealex machine shown in conjunction with a schematic electrical and mechanical representation of the locating mechanism.

Figure 2:
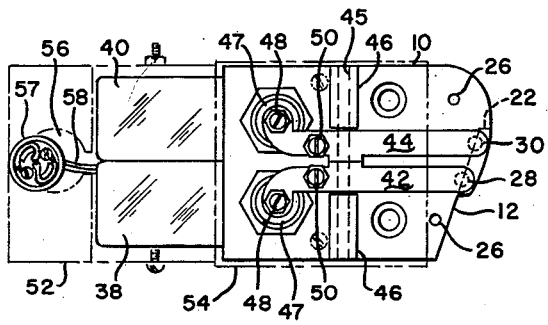
Fig. 2 is a top plan view of Fig. 1.
Figure 4:
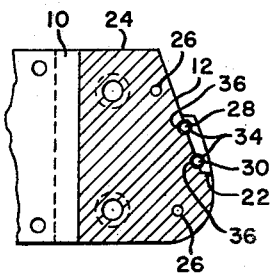
Fig. 4 is a sectional view taken along lines 4—4 of Fig. 1.
Figure 1:
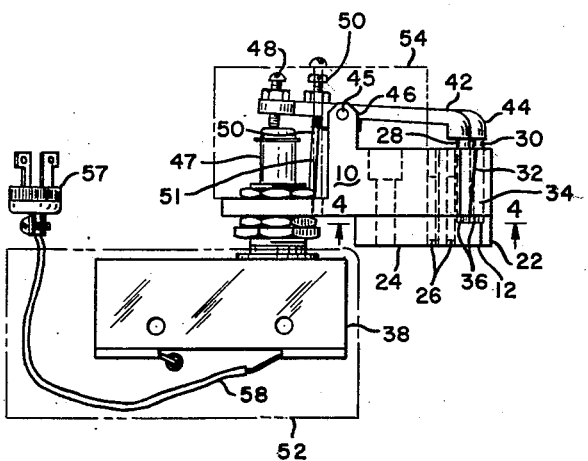
Fig. 1 is a side elevation of one form of a locating mechanism constructed in accordance with the principles of the invention, the housing thereof being shown in dotted outline for purposes of clarity.
Figure 3:
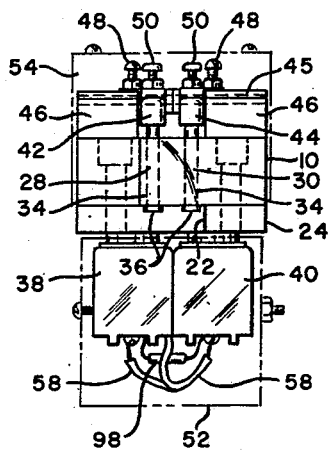
Fig. 3 is a front end view of Fig. 1.

Referring now more particularly to the drawings, the illustrative form of the invention shown in Figs. 1-5 of the drawings includes a base member 10 having a surface 12 formed complementarily for engagement with a keying portion of the article being located or orientated. In the case of an electronic tube mount 14 (Fig. 5) having an uneven lead-in arrangement of lead-ins 16 wherein a keying space, that is a larger space than that between any other two adjacent lead-ins, is defined between two adjacent or keying lead-ins 18 and 20, the surface 12 is planar and has sufficient width in order to contact the keying lead-ins 18 and 20 along the major portion of their length (Fig. 5). The planar surface 12 terminates in a stop or projection 22 formed on the base member 10 for limiting the lateral movement of the keying lead-in 20 and hence of the tube mount 14. In this arrangement, the projection 22 is formed vertically across the width of the surface 12. For convenience of manufacture the surface 12 and the projection 22 may be formed on a separate plate 24 secured to the base member 10 by means, for an example, of the shrunk-fitted pins 26 (Fig. 1).

In order to ensure a predetermined elevational and orientational position of an article relative to the locating device of the invention, suitable linkage, including one or more actuators adapted to contact the keying portion of the article, is provided for actuating switch means and associated circuitry arranged to control indicating means for showing the proper orientation of the article or to control clamping means adapted to secure or to release the article at the aforesaid position.

When intended for use with an electronic tube mount 14, a pair of spaced actuators are movably mounted in the base member 10 and so arranged as to be contacted and moved individually by only the keying lead-ins 18 and 20 when the tube mount 14 is in the desired orientational position. In this example, the aforesaid actuators are provided in the form of parallel actuator pins or rods 28 and 30 mounted for vertical movement in the overhanging portion 32 of the base member 10 and spaced the distance between the keying lead-ins 18 and 20. Obviously, the actuators 28 and 30 may be provided in any other suitable shape. The pins 28 and 30 are also spaced equidistantly from the planar surface 12, in this example, which surface is orientated relative to the position desired for the tube 14 or other article as indicated by the keying space of the lead-ins 16 or other keying portion of an article. The lower ends of the pins 28 and 30 are necked down as indicated by the reference character 34 (Fig. 4) and are partially enclosed by the off-sets 36 in the plate 24. With this arrangement only a portion of the lower ends are exposed for engagement with the lead-ins 18 and 20 and thus the latter must be in contact with or very near to the surface 12 in order to engage the pins 28 and 30, respectively. Since the keying lead-ins 18 and 20 are spaced farther apart than the balance of the lead-ins, in tubes having an uneven or keying lead-in circle, only the keying lead-ins can contact and move the actuator pins 28 and 30.

For articles having other shapes or forms of keying portions than that shown, it may be desirable to mount the actuating pins 28 and 30 in order that the same protrude through the surface 12 to contact spaced parts of the aforesaid keying portion. Thus if the actuating pins are mounted horizontally and the switches, presently to be described, are turned 90° relative to the member 10, the actuating pins may contact the push buttons of the switches directly.

The proper orientation of the tube 14 or other article actuates simultaneously through appropriate linkage, a pair of series-connected switches 38 and 40, which are intended for energizing suitable indicating means or for actuating appropriate grasping means, for an example, a Sealex port closing mechanism presently to be described in connection with Figs. 6 and 7. In this example, such linkage includes a pair of arms 42 and 44 pivotally mounted on the base member 10 by means of the axle 45 and supports 46. The arms 42 and 44 engage the actuator pins 28 and 30 respectively and are arranged to actuate the push buttons 47 of the switches 38 and 40 in response to movement of the actuator pins. Contact between the respective push buttons 47 and the arms 42 and 44 is adjustably maintained by means of the adjusting screws 48. In order to prevent damage to the switches 38 and 40 the downward throw of the arms 42 and 44 is adjustably limited by means of the adjustable stops 50, which include an elongated rod portion 51 adapted to bear against the base member 10. In this example of the locating mechanism, switches having push-button mechanism of extremely limited throw, known as microswitches, are employed to increase the accuracy and to reduce the size of the mechanism.

Suitable housings 52 and 54, shown in dotted outline in Fig. 1 are provided for the switches and the operating linkages, respectively, of the locating mechanism. Housing 52 includes an aperture 56 through which switch leads 58 are conducted for coupling via the plug connector 57 to external circuitry, for an example, the electromagnetically operated port closing means presently to be described with reference to Figs. 6 and 7.

In the application of the invention illustrated in Figs. 6 and 7, the locating mechanism described heretofore is mounted adjacent the loading position of a Sealex machine, said position being occupied by the evacuating port 60 disposed on the revolving turret 62 of the Sealex machine. Each port is provided with a movable cap 64 through which suitable apertures are provided for receipt of the exhaust tubulation 68 of the tube mount 14 and for the coupling thereof to the exhaust manifold (not shown) of the Sealex machine. The cap 64 is provided with an operating extension 70 for turning the cap 64 and causing the same to compress a port rubber (not shown) about the exhaust tubulation 68 to effect a hermetic seal to the evacuating pumps (not shown).

The locating mechanism is supported adjacent the loading port 60 by means of an adjustable bracket 74 secured to the stationary post 76 by means of a mounting plate 78 and arm 79 of an adjustable clamp 80. Mounted between the plate 78 and the arm 79 is an air solenoid 82 having a plunger 84 arranged to contact and move the operating extension 70 in the left hand direction to the closed-port position, via suitable linkage indicated generally at 85. A shield 86 (Fig. 6) is desirably provided for the exposed operating parts of the air solenoid. The operation of the air solenoid 82 is controlled by an electromagnetic valve 87 inserted in the air inlet 88 of the air solenoid 82.

As better shown in Fig. 7, the actuating coil 90 of the valve 86 is connected in series via the conductors 92 with the series-connected switches 38 and 40 of the locating mechanism to a source of electric potential 94. Thus when the tube 14 is inserted and properly orientated relative to the evacuating port 60 and with the keying lead-ins 18 and 20 contacting the surface 12 and projection 22, a slight upward movement of the tube 14 causes the keying lead-ins to move the actuator pins 28 and 30 and associated linkage to close the normally open switches 38 and 40. The overhanging portion 32 is tapered at 96 (Fig. 6) to facilitate moving the tube 14 past the locator during the initial insertion of the tube into the port 60. Since the aforesaid switches are connected in series by means of the conductor 98 (Figs. 1 and 7), both of the switches must be closed simultaneously by movement of the pins 28 and 30 in order to operate the electromagnetically controlled air solenoid to close the evacuating port. Therefore, the port cannot be closed until the tube 14 is in the proper position. The height of the tube 14 is determined accurately by the aforesaid upward movement of the tube 14 to move actuator pins 28 and 30, which movement is limited by the arms 42 and 44 bearing on the push buttons 47 and the stops 50.

From the foregoing it will be apparent that novel mechanism is disclosed for locating an electronic tube or other article in an orientated position in or relative to a station. Numerous modifications of the invention will occur to those skilled in the art without departing from the spirit and scope of the invention as defined in the appended claims.

Accordingly, what is claimed as new is:

1. In a locating mechanism for use with an electronic tube having spaced lead-ins arranged in an endless path and defining a keying space between two keying lead-ins; a member having a plane surface adapted to be engaged by said keying lead-ins; a projection formed on said member at an extremity of said surface; a pair of switch means secured to said member; and a pair of actuators movably mounted in said member and arranged to be contacted by said keying lead-ins, respectively, when engaging said surface and with one of said keying lead-ins engaging said projection, said actuators being spaced the distance between said keying lead-ins and being arranged to effect operation of said switch means, respectively.

2. In a locating mechanism for use with an electronic tube having spaced lead-ins arranged in an endless path and defining a keying space between two keying lead-ins; a member having a plane surface adapted to be engaged by the major portion of the length of said keying lead-ins, said member including a portion overhanging at least a part of said surface; a projection formed on said member at an extremity of said surface; a pair of push-button switches secured to said member; and a pair of actuating rods movably mounted in said overhanging portion and arranged to be contacted by said keying lead-ins, respectively, when engaging said surface, said actuating rods being disposed parallel to the plane of said surface and being spaced the distance between said keying lead-ins, said actuating rods engaging the push-buttons of said switches, respectively.

3. In a locating mechanism for use with an electronic tube having spaced lead-ins arranged in an endless path and defining a keying space between two keying lead-ins; a member having a plane surface adapted to be engaged by the major portion of the length of said keying lead-ins, said member including a portion overhanging at least a part of said surface; a projecting ridge formed on said member at an extremity of said surface, said ridge extending along substantially the width of said surface and being arranged to be engaged by one of said keying lead-ins; and a pair of actuators movably mounted in said member adjacent said surface, one of said actuators being adjacent said ridge, and arranged to be contacted by said keying lead-ins, respectively, when engaging said surface with one of said keying lead-ins engaging said ridge, said actuators being spaced the distance between said keying lead-ins and being arranged to effect operation of said switch means, respectively.

4. In a locating mechanism for use with an electronic tube having spaced lead-ins arranged in an endless path and defining a keying space between two keying lead-ins; a member having a plane surface adapted to be engaged by said keying lead-ins; a projection formed on said member at an extremity of said surface; a pair of switch means secured to said member; a pair of actuating rods movably mounted in said member and having necked-down end portions arranged to be contacted by said keying lead-ins, respectively, when engaging said surface and with one of said keying lead-ins engaging said projection, said actuating rods being spaced the distance between said keying lead-ins and being arranged to effect operation of said switch means, respectively, said actuating rods being so arranged that said end portions lie adjacent said surface.

5. In a locating mechanism, a member having a vertical planar face to be engaged by a side portion of an article, a portion of said mechanism overhanging said face and having a vertically movable actuator in said overhanging portion exposed at the lower face of the overhanging portion and adapted to be engaged by a top surface portion of said article, and a switch in operative relation to the actuator to be operated thereby a port for receiving a part of said article, means including an electromagnet for effecting closure of the port about the article and conductors between the switch and the electromagnet, the vertically movable actuator in said overhanging portion being directly above the port.

6. In a locating mechanism, a member having a vertical planar face to be engaged by a side portion of an article, a portion of said mechanism overhanging said face and having a spaced pair of vertically movable actuators in said overhanging portion exposed at the lower surface of the overhanging portion and adapted to be engaged by a top surface portion of said article, and a pair of switches in operative relation to the actuators, to be operated thereby a port for receiving a part of said article, means including an electromagnet for effecting closure of the port about the article and conductors between the switches and the electromagnet, the vertically movable actuators in said overhanging portion being directly above the port.

7. In a locating mechanism, a member having a vertical planar face to be engaged by a side portion of an article, a portion of said mechanism overhanging said face and having a spaced pair of pins movable vertically in said overhanging portion with ends exposed at the lower face of said overhanging portion, a pair of switch means secured to said member, and a pair of arms pivotally mounted on said member individually engaged by said pins and operative on said switches.

8. A locating and port closing mechanism for use with an article having a first planar keying portion and a second keying portion at right angles thereto, a member having a planar surface to be engaged by the first keying portion of the article, a portion of said mechanism overhanging said planar surface and having therein a pair of longitudinally displaceable actuators exposed through a face of the overhanging portion which is at right angles to the planar surface, said actuators being adapted to be actuated by engagement with the second keying portion of the article, switches in position to be controlled by said actuators, a port for receiving a part of said article, means including an electromagnet for effecting closure of the port about the article and conductors between the switches and the electromagnet.

References Cited in the file of this patent
UNITED STATES PATENTS

| | | |
|---|---|---|
| 2,549,296 | Dilts | Apr. 17, 1951 |
| 2,570,103 | Groat | Oct. 2, 1951 |